United States Patent

[11] 3,611,997

| [72] | Inventor | Edward L. Benno<br>Route 1, Box 198, Grayslake, Ill. 60030 |
|---|---|---|
| [21] | Appl. No. | 853,266 |
| [22] | Filed | Aug. 27, 1969 |
| [45] | Patented | Oct. 12, 1971 |

[54] LIVESTOCK FEEDING ARRANGEMENT
3 Claims, 2 Drawing Figs.

[52] U.S. Cl. .................... 119/51 R,
265/71, 177/211, 177/134, 119/28
[51] Int. Cl. .................... A01k 01/00,
A01k 05/00
[50] Field of Search .................... 177/211,
134; 338/3, 119/16, 27, 28, 51, 51.11

[56] References Cited
UNITED STATES PATENTS

| 861,882 | 7/1907 | Noppel | 119/28 |
| 1,259,802 | 3/1918 | St. John | 119/28 |
| 2,488,349 | 11/1949 | Thurston | 338/3 |
| 2,825,300 | 3/1958 | Carlson | 119/16 |
| 2,962,275 | 11/1960 | Thurston | 177/211 |
| 3,085,642 | 4/1963 | Raskin | 177/134 |
| 3,119,373 | 1/1964 | Schmid | 119/28 |
| 3,137,270 | 6/1964 | Rigterink et al. | 119/28 |
| 3,148,663 | 9/1964 | Conover | 119/16 |
| 3,303,822 | 2/1967 | Cohen | 119/51 |
| 3,455,279 | 7/1969 | Krevit | 119/28 |

*Primary Examiner*—Aldrich F Medbery

ABSTRACT: A livestock feeding arrangement for feeding a group of relatively large animals in accordance with their weight comprising a slatted floor pen on which the livestock are completely confined, means for flushing manure from the slatted floor, and weighing means associated with the slats for weighing the livestock as a group after the manure has been flushed therefrom and feeding the livestock according to the weight of the group.

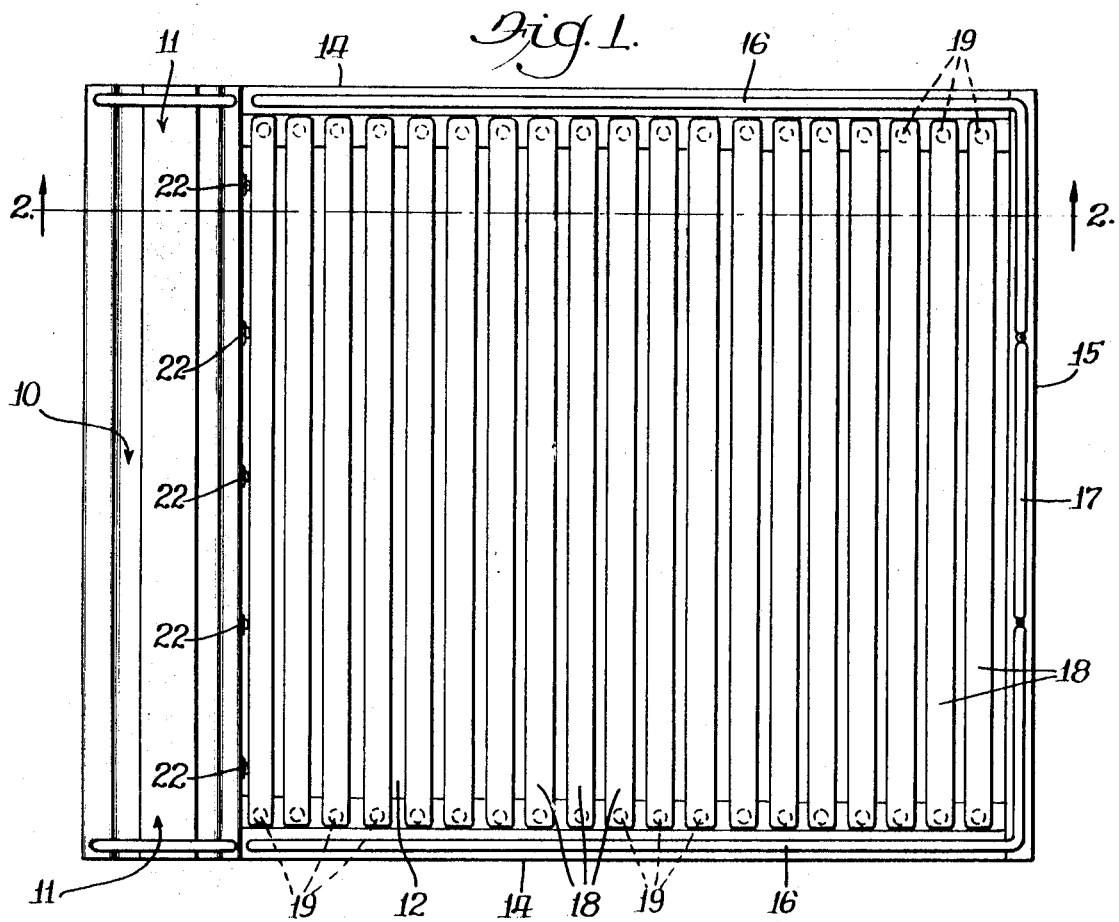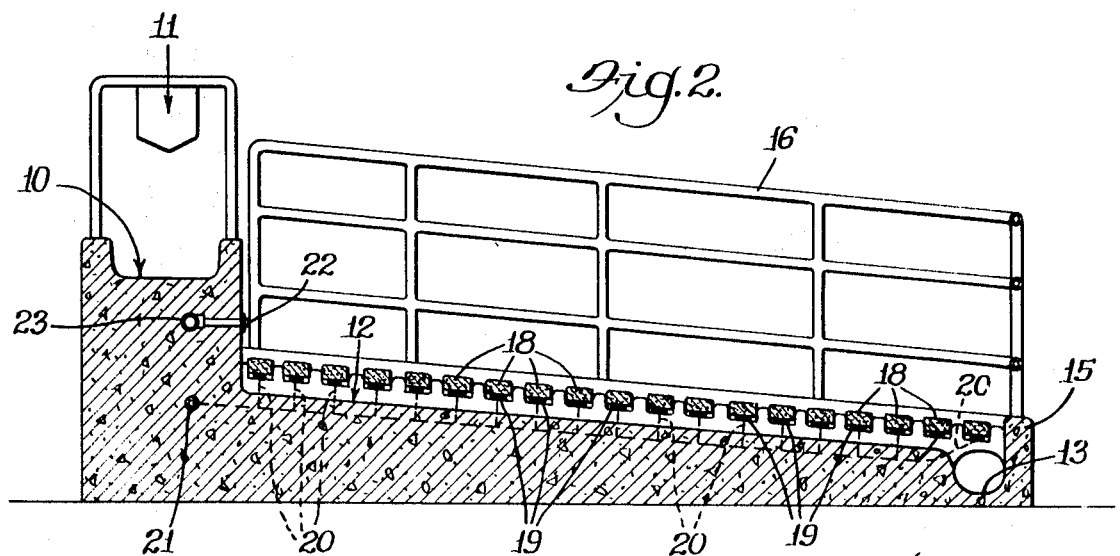

LIVESTOCK FEEDING ARRANGEMENT

SUMMARY

This invention concerns a pen arrangement for confined feeding of relatively large livestock such as cattle or hogs in which the pen arrangement effects feeding of the livestock responsive to their weight. Briefly, the invention involves the combination of a series of livestock supporting slats in a confined feeding pen with the slats spaced apart to permit manure to drop and be flushed from the slats and with the ends of the slats carried on load responsive means so that the confined livestock can be weighed and fed in accordance with their weight gain.

DESCRIPTION

FIG. 1 is a top plan view of a livestock pen constructed according to the invention; and FIG. 2 is a cross sectional view taken along the line 2—2 of FIG. 1.

The present embodiment is the preferred embodiment, but it is to be understood that changes can be made in the present embodiment by one skilled in the art without departing from the spirit and scope of the present invention.

Generally, the invention is intended to be used in confined livestock feeding arrangements for relatively large livestock such as cattle or hogs wherein the livestock are confined in a series of adjoining pens with the number in each pen being of a relatively uniform group in respect to feeding requirements. In confined feeding arrangements it is desirable to group the animals in the pens in uniform groups depending on various factors such as sex, age, weight, condition or disposition. With such a distribution of the livestock, the separate groups of livestock can be fed different feed formulas to produce maximum weight gain at minimum feed cost for each specific group. In confined feeding arrangements, it is further desirable to periodically know the weight of the animals of each group in order that the feed formulas can be changed in accordance with weight gain or the rate of weight gain. The weight of the individual animals of each group is not as important as the weight or weight change rate of each group of animals. Presently known systems for relatively large animals contemplate periodic driving of the animals from each pen over a central scale to record their weights and to then return them to their pens. Those systems have the disadvantage of requiring manual labor to drive the animals between the pens and the scale. A further disadvantage is that such procedures can disturb the animals and can thereby upset their rate of weight gain. As a result of those disadvantages it is not practical to weigh the livestock very often. The present invention permits substantially continuous weighing of the groups of animals with no disturbance of the livestock,.

Various types of slatted floor constructions for livestock pens are known. Those constructions permit the use of manure removal systems which flush the manure from the slatted floor and carry it away as a slurry by means of drains and pumps. It appears that those pen constructions have substantial advantages over solid or dirt floor constructions. The manual labor required is drastically reduced, and the livestock are more healthy and their hides are of a higher quality.

The present invention utilizes the advantageous slatted floor constructions to form an integral part of a livestock weighing system to add the advantages of a confined pen weighing system with no loss of the advantages of a slatted floor construction. An additional unexpected advantage is that the combination permits accurate determination of the rate of feed consumption relative to the rate of body weight gain.

In detail, FIGS. 1 and 2 show one embodiment of the present invention. It is contemplated that the pen shown in FIG. 1 would be duplicated to form a series of identical adjoining pens. A suitable material for the pen construction is reinforced concrete One side of each of the pens is defined by a feed bunk 10 out of which the livestock feed. A feeder 11 is carried over the feed bunk 10 to carry and deposit feed throughout the entire length of the feed bunk of all of the adjoining pens. A suitable feeder which will deposit different feed rations in different bunks can be seen in U.S. Pat. No. 3,256,864, issued June 21, 1966 to E. L. Benno.

In the present embodiment, the flour 12 of the pen is sloped downwardly from the feed bunk 10 to the rear of the pen. One reason for the slope is that in flushing manure from the pen, the manure slurry will drain from the floor 12 into a trough 13 at the rear of the pen. The trough 13 is connected through openings in the pen sidewalls to adjoining pens so that a common drainage course for all of the pens is provided.

The sidewalls of the pen are defined by curbs 14 which also may be suitably formed of concrete. The rear wall is defined by a curb 15. A fence 16 is provided on the side and rear curbs 14 and 15 to confine the livestock in the pen. A gate 17 is provided in the rearward section of the fence 16 for admitting livestock to the pen.

The inward portions of the curbs 14 are stepped downwardly and castellated to receive and retain the slats 18.

The slats 18 may suitably be formed of a material such as prestressed concrete and are retained by the inward portions of the curbs 14 above the floor 12 and in a parallel spaced apart relationship and against any substantial movement other than in a vertical direction.

The curbs 14 have a slope which conforms to the slope of the floor 12 for convenience of construction and to give the slats 18 a stepped slope from the feed bunk 10 down to the rear curb 15. That slope of the slats 18 is desirable for the reason that cattle will tend to face uphill in dropping manure thereby tending to keep the area immediately adjacent the feed bunk 10 clean.

A load responsive member 19 is carried in each slot or niche of the curbs 14 below the ends of the slats 18 disposed therein to respond to or indicate the load on each slat 18. The load responsive members 19 in the present embodiment are formed as an electrical strain gage comprising a wire assembly which varies in electrical strain gage comprising a wire assembly which varies in electrical resistance in predetermined proportion to loads on the assembly causing the wire to change in length. Leads 20 from the load responsive members 19 are carried through the curbs 14 to a conduit 21 below the feed bunk 10. The conduit 21 carries the leads from the load responsive members 19 to the control for the feeder 11. Any well known computing means may be provided to zero out the weight of the slats 18 on the load responsive members 19 and to convert the response of the members 19 to the weight of livestock thereon to suitable weight indications of the livestock. Such computing means may also respond to incremental weight indication changes to control the feeder 11.

Prior to taking weight readings of the livestock in the pen on the slats 18, the slats 18 are flushed free of any accumulations of manure by any suitable means. The present embodiment discloses a series of water nozzles 22 mounted in the wall of the feed bunk 10. The nozzles 22 are connected to a header 23 extending through the feed bunk 10 so that suitable water under pressure may be applied to the nozzles 22 to flush the manure from the slats 18 to the floor 12 therebelow and thence to the gutter or trough 13.

Having described the invention, what is considered new and desired to be protected and claimed by Letters Patent is:

1. In a livestock-feeding arrangement, a pen for confining livestock, a feed bunk for livestock confined in said pen, a manure-receiving outlet at the floor of said pen, curb members extending along at least two opposite sides of said pen, a plurality of slats, said slats positioned in a substantially parallel spaced apart relationship and having the ends thereof carried on said curb members and above the floor of said pen to completely support any livestock confined in said pen the spacing between said slats being great enough to permit manure from said livestock to be flushed from said slats to the floor of said pen for reception by said outlet and being small enough to prevent said livestock from contact with said floor, spray means carried above said slats in the side of said pen defined by said feed bunk for flushing manure from the top said slats to said floor prior to weighing any livestock confined in said pen, a plurality of cattle load responsive weigh members carried on said curb members and below the ends of said slats to indicated the weight of said livestock confined in said pen on said slats and defining a means to effect the amount of feeding of said livestock in response to the weight of said livestock.

2. In a livestock feeding arrangement as defined in claim 1, said load responsive members comprising electrical strain gages operating to change in electrical resistance in response to changes in weight thereon.

3. A method for feeding livestock comprising the steps of, confining said livestock as a group in a pen on a plurality of slats spaced apart sufficiently to permit manure produced by said livestock to be flushed from said slats, feeding said livestock as a group in said pen on said slats, flushing manure produced by said livestock after feeding from said slats, weighing said slats and said livestock confined thereon as a group after flushing said manure from said slats, feeding said livestock as a group in response to the weight gain of said livestock as a group, and repeating the foregoing steps at regular increments of time.